United States Patent
Budampati et al.

(10) Patent No.: US 8,428,067 B2
(45) Date of Patent: Apr. 23, 2013

(54) METHOD AND APPARATUS FOR DYNAMIC ASSIGNMENT OF QUALITY OF SERVICE PARAMETERS IN A COMMUNICATION NETWORK

(75) Inventors: Ramakrishna S. Budampati, Maple Grove, MN (US); Soumitri N. Kolavennu, Minneapolis, MN (US); Denis Foo Kune, Saint Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 187 days.

(21) Appl. No.: 12/020,227

(22) Filed: Jan. 25, 2008

(65) Prior Publication Data

US 2009/0059786 A1 Mar. 5, 2009

Related U.S. Application Data

(60) Provisional application No. 60/967,342, filed on Sep. 4, 2007.

(51) Int. Cl.
*H04L 12/28* (2006.01)

(52) U.S. Cl.
USPC .............. 370/395.21; 370/395.2; 370/395.1; 370/389; 370/351

(58) Field of Classification Search .......... 370/228–332, 370/351, 389, 392, 395.21
See application file for complete search history.

(56) References Cited

U.S. PATENT DOCUMENTS

| | | | |
|---|---|---|---|
| 6,539,427 B1 * | 3/2003 | Natarajan et al. | 709/224 |
| 7,630,326 B1 * | 12/2009 | Shear | 370/254 |
| 2002/0181395 A1 * | 12/2002 | Foster et al. | 370/229 |
| 2004/0081091 A1 | 4/2004 | Widmer et al. | |
| 2005/0070315 A1 * | 3/2005 | Rai et al. | 455/466 |
| 2006/0176169 A1 * | 8/2006 | Doolin et al. | 340/521 |
| 2007/0076600 A1 * | 4/2007 | Ekl et al. | 370/229 |
| 2007/0093236 A1 * | 4/2007 | Lian et al. | 455/412.2 |
| 2007/0195788 A1 * | 8/2007 | Vasamsetti et al. | 370/395.21 |
| 2007/0283005 A1 * | 12/2007 | Beliles et al. | 709/224 |
| 2009/0034414 A1 * | 2/2009 | Schuette et al. | 370/230.1 |

FOREIGN PATENT DOCUMENTS

WO WO 2006/067271 A1 6/2006

OTHER PUBLICATIONS

Ramakrishna S. Budampati et al., "System and Method for Providing Simultaneous Connectivity Between Devices in an Industrial Control and Automation or Other System", U.S. Appl. No. 11/981,212, filed Oct. 30, 2007.

Ramakrishna S. Budampati et al., "Apparatus and Method Supporting a Redundancy-Managing Interface Between Wireless and Wired Networks", U.S. Appl. No. 11/888,090, filed Jul. 31, 2007.

Ramakrishna S. Budampati, "Method and Apparatus for Improved Message Delivery for Higher Priority Nodes or Messages in an Industrial Wireless Network", U.S. Appl. No. 12/018,406, filed Jan. 23, 2008.

* cited by examiner

*Primary Examiner* — Hassan Phillips
*Assistant Examiner* — Gautam Sharma

(57) ABSTRACT

A method includes identifying a condition associated with a communication network and/or an industrial control and automation system. The method also includes selecting, based on the identified condition, one or more quality of service (QoS) parameters used to route data through the communication network. In addition, the method includes communicating information identifying the one or more QoS parameters to one or more components in the communication network. The one or more QoS parameters could be contained within one of multiple QoS policies, and the method could include selecting one of the QoS policies. The condition could represent an emergency condition, and the one or more QoS parameters could include a higher QoS priority for traffic (such as voice communications and sensor data) to and from specified personnel (such as first responders). The communication network could represent at least one wired network and/or at least one wireless network.

20 Claims, 5 Drawing Sheets

METHOD AND APPARATUS FOR DYNAMIC ASSIGNMENT OF QUALITY OF SERVICE PARAMETERS IN A COMMUNICATION NETWORK

CROSS-REFERENCE TO RELATED APPLICATIONS

This application claims priority under 35 U.S.C. §119(e) to U.S. Provisional Patent Application No. 60/967,342 filed on Sep. 4, 2007, which is hereby incorporated by reference.

TECHNICAL FIELD

This disclosure relates generally to communication networks and more specifically to a method and apparatus for dynamic assignment of quality of service (QoS) parameters in a communication network.

BACKGROUND

Many buildings, facilities, and other structures include secure communication networks, which are used for wireless and other types of communications. For example, chemical plants and other industrial facilities often include wired and wireless networks, which can be used for a wide variety of purposes. As particular examples, the wired and wireless networks in industrial facilities could be used to transport data to and from process controllers, process sensors, and process actuators. The wireless networks could also facilitate wireless communications between personnel working in the industrial facilities.

SUMMARY

This disclosure provides a method and apparatus for dynamic assignment of quality of service parameters in a communication network.

In a first embodiment, a method includes identifying a condition associated with a communication network and/or an industrial control and automation system. The method also includes selecting, based on the identified condition, one or more quality of service parameters used to route data through the communication network. In addition, the method includes communicating information identifying the one or more quality of service parameters to one or more components in the communication network.

In particular embodiments, the one or more components in the communication network are operating according to a first quality of service policy. Also, selecting the one or more quality of service parameters includes selecting a second quality of service policy. Each quality of service policy identifies one or more quality of service parameters for each of multiple types of data messages. The method may further include selecting the first quality of service policy and communicating information identifying the first quality of service policy over the communication network.

In other particular embodiments, identifying the condition includes identifying an emergency condition associated with the industrial control and automation system. Also, selecting the one or more quality of service parameters includes identifying a higher quality of service priority for traffic to and from specified personnel. The specified personnel could include police officers, firefighters, medical personnel, and/or hazardous material personnel. The traffic may include voice traffic to and from the specified personnel and/or sensor data used by the personnel.

In yet other particular embodiments, the one or more quality of service parameters include a priority, an encryption mechanism, an authentication mechanism, a number of routes traversed through the communication network, a number of retries for sending data, and/or use of end-to-end acknowledgements.

In still other particular embodiments, the method includes identifying a second condition associated with the communication network and/or the industrial control and automation system. The method also includes selecting, based on the identified second condition, one or more second quality of service parameters. In addition, the method includes communicating information identifying the one or more second quality of service parameters to the one or more components in the communication network.

In other particular embodiments, the method includes determining that the condition has been resolved. The method also includes selecting one or more second quality of service parameters associated with normal operation of the communication network. In addition, the method includes communicating information identifying the one or more second quality of service parameters to the one or more components in the communication network.

In additional particular embodiments, the communication network includes a wireless network. Also, the one or more components in the communication network include a gateway node coupled to a wired network, an infrastructure node communicating with the gateway node, and/or a leaf node communicating with the gateway node or the infrastructure node.

In a second embodiment, an apparatus includes at least one interface configured to communicate with one or more components in a communication network. The apparatus also includes at least one controller configured to identify a condition associated with the communication network and/or an industrial control and automation system. The at least one controller is also configured to select, based on the identified condition, one or more quality of service parameters used to route data through the communication network. The at least one controller is further configured to communicate information identifying the one or more quality of service parameters to the one or more components in the communication network using the at least one interface.

In a third embodiment, a computer program is embodied on a computer readable medium. The computer program includes computer readable program code for identifying a condition associated with a communication network and/or an industrial control and automation system. The computer program also includes computer readable program code for selecting, based on the identified condition, one or more quality of service parameters used to route data through the communication network. The computer program further includes computer readable program code for communicating information identifying the one or more quality of service parameters to one or more components in the communication network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
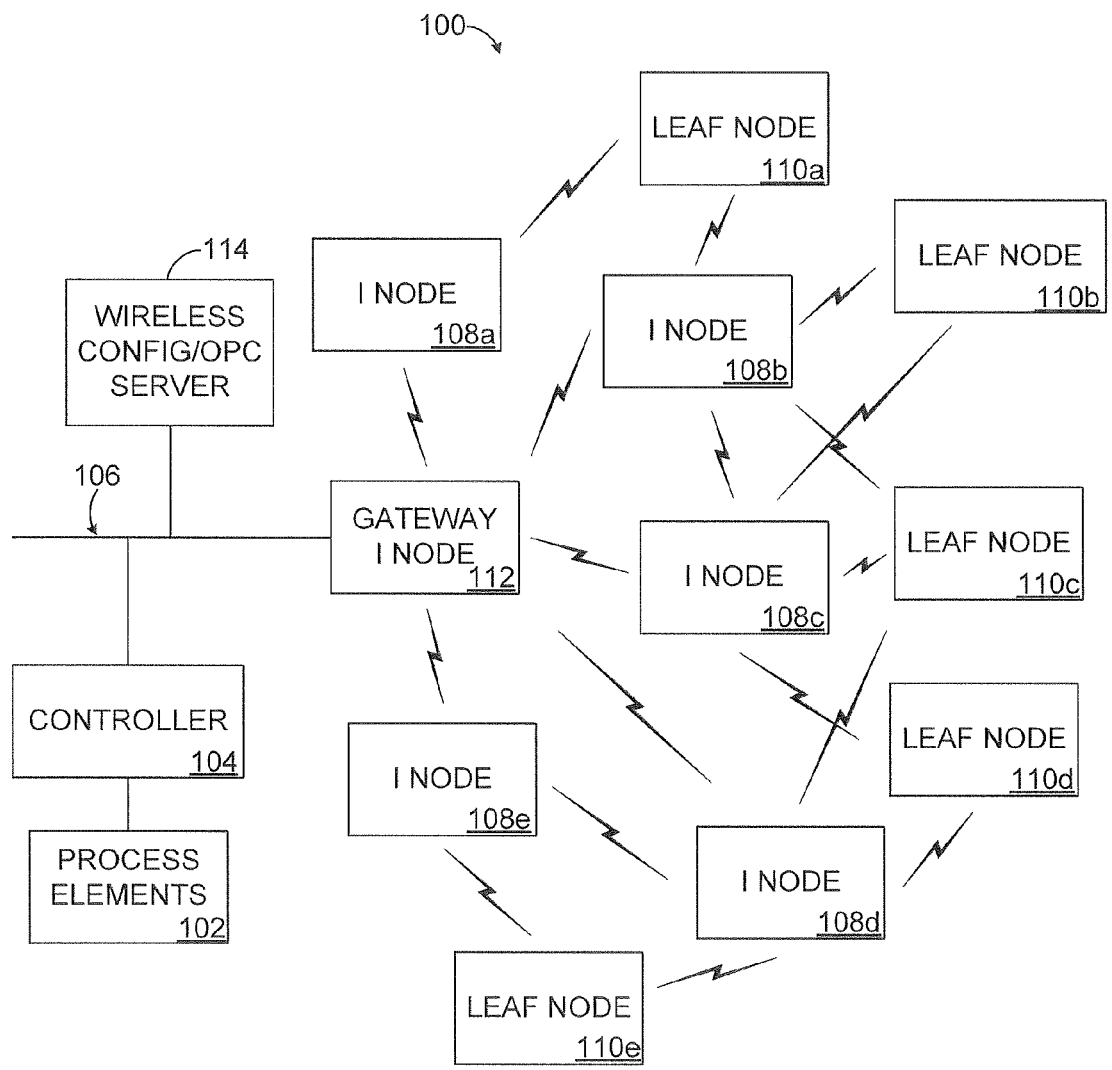
FIG. 1 illustrates an example industrial control and automation system according to this disclosure.

FIG. 1 illustrates an example industrial control and automation system 100 according to this disclosure. The embodiment of the industrial control and automation system 100 shown in FIG. 1 is for illustration only. Other embodiments of the industrial control and automation system 100 could be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent sensors, actuators, or any other or additional industrial equipment in a processing environment. Each of the process elements 102 includes any suitable structure for performing one or more functions in a processing or production system. Also, the phrase "industrial control and automation system" generally refers to a system that automates and controls at least one process.

A controller 104 is coupled to the process elements 102. The controller 104 controls the operation of one or more of the process elements 102. For example, the controller 104 could receive information associated with the system 100, such as by receiving sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks for communicating with wireless sensors or other wireless devices. In this example, a wireless network (such as a mesh network) is formed using infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110e form a wireless network capable of providing wireless coverage to a specified area, such as in a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110e typically represent battery-powered devices, meaning these nodes receive operating power from internal batteries or other power supplies. Because of this, these nodes 110a-110e are often more limited in their operations in order to help preserve the operational life of their internal power supplies.

Each of the nodes 108a-108e and 110a-110e includes any suitable structure facilitating wireless communications, such as an RF transceiver. Each of the nodes 108a-108e and 110a-110e could also include other functionality, such as functionality for generating or using data communicated over the wireless network. For example, the leaf nodes 110a-110e could represent wireless sensors in an industrial facility, where the sensors are used to measure various characteristics within the facility. These sensors could collect sensor readings and communicate the sensor readings to the controller 104 via the gateway infrastructure node 112. The leaf nodes 110a-110e could also represent actuators that can receive control signals from the controller 104 and adjust the operation of the industrial facility. In this way, the leaf nodes 110a-110e may include or operate in a similar manner as the process elements 102 that are physically connected to the controller 104. The leaf nodes 110a-110e could further represent handheld user devices (such as INTELATRAC devices from HONEYWELL INTERNATIONAL INC.), mobile stations, programmable logic controllers (PLCs), or any other or additional devices.

In particular embodiments, the leaf nodes 110a-110e can include 802.15.4-based low data-rate sensors and 802.11-based high data-rate devices, and the various nodes in FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

The gateway infrastructure node 112 communicates wirelessly with, transmits data to, and receives data from one or more infrastructure nodes 108a-108e and possibly one or more leaf nodes 110a-110e. The gateway infrastructure node 112 also converts data between the protocol(s) used by the network 106 and the protocol(s) used by the nodes 108a-108e and 110a-110e. For example, the gateway infrastructure node 112 could convert Ethernet-formatted data (transported over the network 106) into a wireless protocol format (such as an IEEE 802.11a, 802.11b, 802.11g, 802.11n, 802.15.3, 802.15.4, or 802.16 protocol format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In this example, a wireless configuration and OLE for Process Control (OPC) server 114 can be used to configure and control various aspects of the process control system 100. For example, the server 114 could be used to configure the operation of the infrastructure nodes 108a-108e and the gateway node 112. The server 114 could also be used to support security in the industrial control and automation system 100. For instance, the server 114 could distribute cryptographic keys or other security data to various components in the industrial control and automation system 100, such as to the nodes 108a-108e, 110a-110e, and 112. The server 114 includes any hardware, software, firmware, or combination thereof for configuring wireless networks and providing security information.

In one aspect of operation, one or more wired or wireless networks in FIG. 1 could represent multi-functional networks. In these embodiments, a multi-functional network could be used for sensor and control data reporting, alarm reporting, firmware downloads, worker collaboration, voice communications, and other functions. Data messages transported in a multi-functional network may therefore have different priorities, which can be based on their associated functions and defined by their quality of service (QoS) requirements. Also, the data messages can be routed through a network according to these priorities. Bandwidth in a network can typically be reserved for one or more specified QoS classes, and remaining bandwidth is shared by messages of the other QoS classes.

The priorities of various data messages in the system 100 may not remain static and can change over time as conditions in the system 100 change. For example, during normal operations, higher priorities can be allotted to latency-controlled data (such as alarms and closed-loop control system packets). Other data (such as device configuration, code download, and network diagnostic data) can have lower priorities. As another example, sensor data used in a feedback loop can have a higher priority than sensor data used just for monitoring purposes. At other times, the priorities of at least some of this data can be changed. For instance, during an emergency, higher priorities can be allotted for "first responders" (such as police, firefighter, and medical personnel) and safety-related operations. Among other things, this may allow voice and data communications to and from the first responders to have a higher priority in a wireless or other network. Other types of data can be given lower priorities during the emergency situation. In other words, the quality of service classes of the data can be modified over time depending on the circumstances in the system 100.

Additional details regarding the dynamic assignment of quality of service priorities (or other parameters) in a network are provided below. It may be noted that this functionality is described below with reference to a wireless network, although the same or similar functionality could also be used with wired networks.

Although FIG. 1 illustrates one example of an industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, while described as supporting wired and wireless networks, the industrial control and automation system 100 could support any number of wireless or wired networks, at least one of which can have quality of service parameters dynamically controlled.

Figure 2:
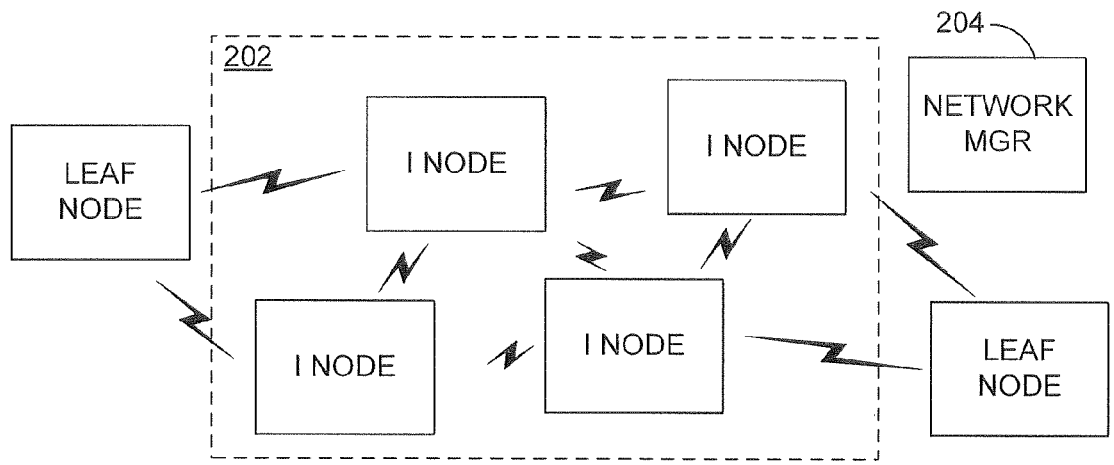
FIG. 2 illustrates additional details of an example wireless network in an industrial control and automation system according to this disclosure.

FIG. 2 illustrates additional details of an example wireless network in an industrial control and automation system 100 according to this disclosure. The portion of the industrial control and automation system 100 shown in FIG. 2 is for illustration only. Other embodiments of the industrial control and automation system 100 could be used without departing from the scope of this disclosure.

As shown in FIG. 2, a wireless network 202 is formed by the various infrastructure nodes in the industrial control and automation system 100. The wireless network 202 facilitates wireless communications with various leaf nodes in the system 100. The quality of service priorities or other parameters of different data transmitted over the wireless network 202 can be controlled by a network manager 204. For example, the network manager 204 could communicate with the infrastructure and/or leaf nodes in the system 100 in order to enforce appropriate quality of service parameters in the system 100. The network manager 204 could also dynamically change the quality of service parameters in the system 100.

Dynamically changing the QoS parameters of data in a network can be done as follows. The QoS class of each data message sent over the wireless network 202 can be assigned by the originator of the message, such as a leaf node. Among other things, the network manager 204 can set the priority of each QoS class and describe the method of routing messages within that QoS class through the network 202. When there is a change in the state of the wireless network 202 or the system 100, the network manager 204 could then reassign the priorities or other parameters of the QoS classes. This could be done, for example, by transmitting new QoS parameters as a broadcast over the entire network 202. The network manager 204 could also distribute predefined policies associated with the QoS classes and enforce a particular policy based on the current situation in the wireless network 202 or the system 100. Changes in policies could be triggered by the network manager 204, such as upon the detection of a particular condition. Changes in policies could also be triggered by individual nodes, such as when a node detects a specified event. Changes in policies could further be triggered manually by a user.

In some embodiments, the quality of service parameters define or include routing functions for the wireless network 202, as well as security and reliability functions associated with the wireless network 202. For example, the encryption and authentication mechanisms used in the wireless network 202 could be changed dynamically as part of the dynamic modification of the quality of service parameters. Also, the number of routes a message traverses through the network 202, a number of retries for sending a message, the use of end-to-end acknowledgements, and other communication protocol parameters could also be dynamically changed.

The network manager 204 could detect changes in the wireless network 202 or in the system 100 in any suitable manner. For example, the network manager 204 could receive user input indicating that an emergency or other condition is present. The network manager 204 could also receive messages (such as over the network 106 or the wireless network 202) directed to the network manager 204 indicating that a problem has developed in the system 100. The network manager 204 could further be wired into or receive signals from an alarm system (such as a fire or hazardous material alarm system), allowing the network manager 204 to identify when problems occur. Any other or additional techniques could be used to identify (or to notify the network manager 204 of) a change in the condition of the network 202 or the system 100.

The network manager 204 includes any hardware, software, firmware, or combination thereof for dynamically assigning quality of service parameters in one or more wired or wireless networks. Depending on the implementation, the network manager 204 could form part of another component (such as an infrastructure node, gateway infrastructure node, leaf node, or OPC server), or the network manager 204 could represent a stand-alone component used within or coupled to a network being managed. One example embodiment of the network manager 204 is shown in FIG. 3, which is described below.

Although FIG. 2 illustrates additional details of one example wireless network in an industrial control and automation system 100, various changes may be made to FIG. 2. For example, the network manager 204 could manage any suitable number and type(s) of communication networks, including wired and wireless networks. Also, a wireless network could include any suitable number of nodes and communicate with any suitable number of leaf nodes. In addition, the industrial control and automation system 100 could include any other or additional communication networks.

Figure 3:
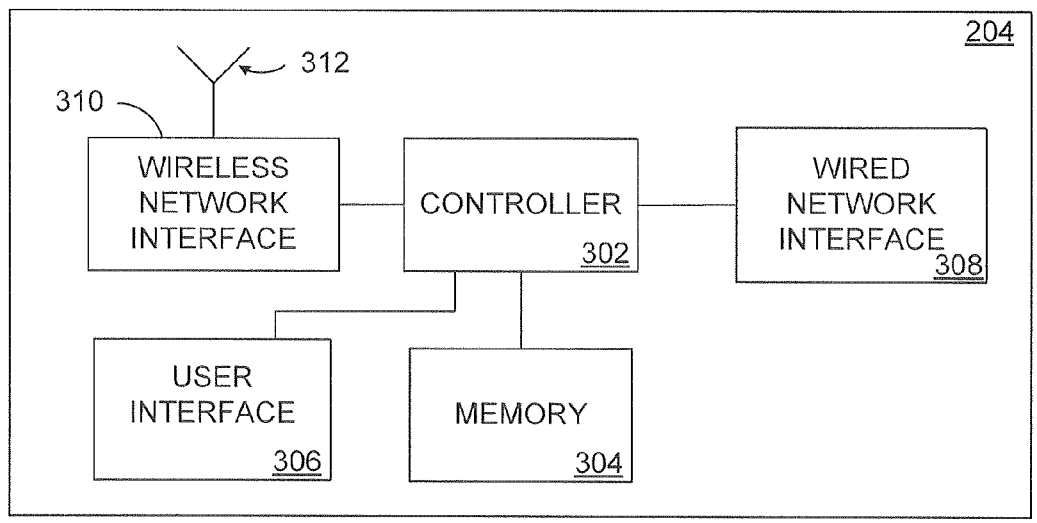
FIG. 3 illustrates an example network manager in an industrial control and automation system according to this disclosure.

FIG. 3 illustrates an example network manager 204 in an industrial control and automation system according to this disclosure. The embodiment of the network manager 204 shown in FIG. 3 is for illustration only. Other embodiments of the network manager 204 could be used without departing from the scope of this disclosure.

As shown in FIG. 3, the network manager 204 includes a controller 302. The controller 302 controls the overall operation of the network manager 204. For example, the controller 302 may provide data to various external components for enforcing quality of service priorities or other parameters in the system 100. The quality of service parameters could be enforced by providing QoS data to individual components or by broadcasting QoS data to multiple components. The controller 302 may also detect changes in conditions in a communication network or a system and dynamically adjust the quality of service parameters. As a particular example, the controller 302 could identify when an emergency condition exists and dynamically make the QoS priority of first responder voice and data traffic higher than all other QoS classes. The controller 302 includes any suitable hardware, software, firmware, or combination thereof for controlling the quality of service parameters in at least one communication network. As particular examples, the controller 302 could represent a processor, microprocessor, microcontroller, field programmable gate array (FPGA), or other processing or control device.

A memory 304 is coupled to the controller 302. The memory 304 stores any of a wide variety of information used, collected, or generated by the network manager 204. For example, the memory 304 could store data identifying the quality of service parameters for one or more types of data. The QoS data could take the form of policies, each of which may define the quality of service parameters for multiple types of network data traffic. The controller 302 could use the conditions in a network or system to select and enforce a particular quality of service policy. The memory 304 includes any suitable volatile and/or non-volatile storage and retrieval device or devices.

The network manager 204 further includes a user interface 306, which facilitates user interaction and control over the network manager 204. For example, the user interface 306 may present graphical displays to a user, which may allow the user to control the generation, distribution, and enforcement of quality of service parameters (in the form of policies or other forms). The user interface 306 may also allow users to indicate that certain conditions exist or to select and enforce particular quality of service parameters, policies, or other values. The user interface 306 could provide any other or additional functionality according to particular needs.

In addition, depending on the configuration of the network manager 204, the network manager 204 may include one or more interfaces to external networks. For example, the network manager 204 may include a wired network interface 308, which could be physically coupled to a wired network. The wired network interface 308 represents any suitable structure facilitating communication over a wired network, such as an Ethernet interface. The network manager 204 may also or alternatively include a wireless network interface 310, which could be used to wirelessly communicate with one or more nodes in a wireless network via an antenna 312. The wireless network interface 310 represents any suitable structure facilitating communication with a wireless network, such as an RF transceiver.

Although FIG. 3 illustrates one example of a network manager 204 in an industrial control and automation system, various changes may be made to FIG. 3. For example, the functional division shown in FIG. 3 is for illustration only. Various components in FIG. 3 could be combined, subdivided, or omitted and additional components could be added according to particular needs.

Figure 4A:
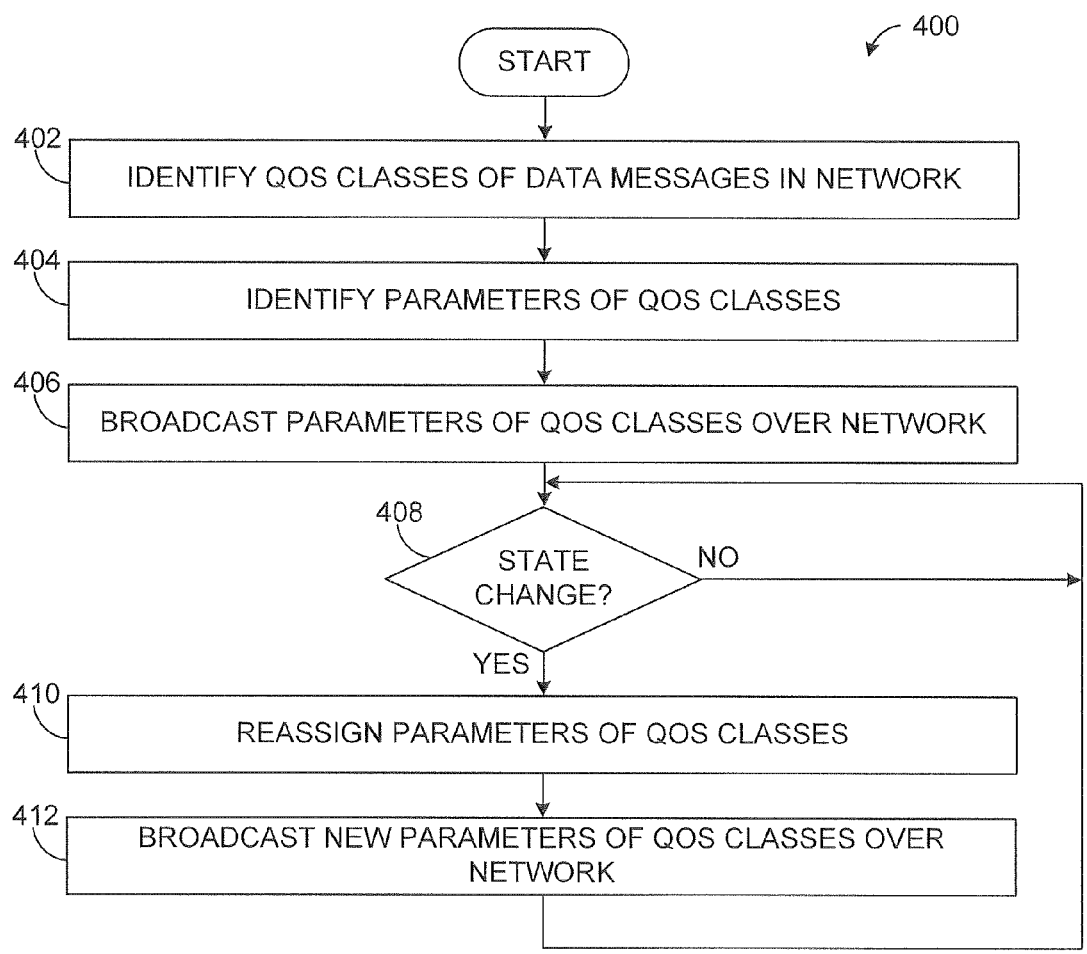
FIGS. 4A and 4B illustrate example methods for dynamic assignment of quality of service parameters by a network manager according to this disclosure.
Figure 4B:
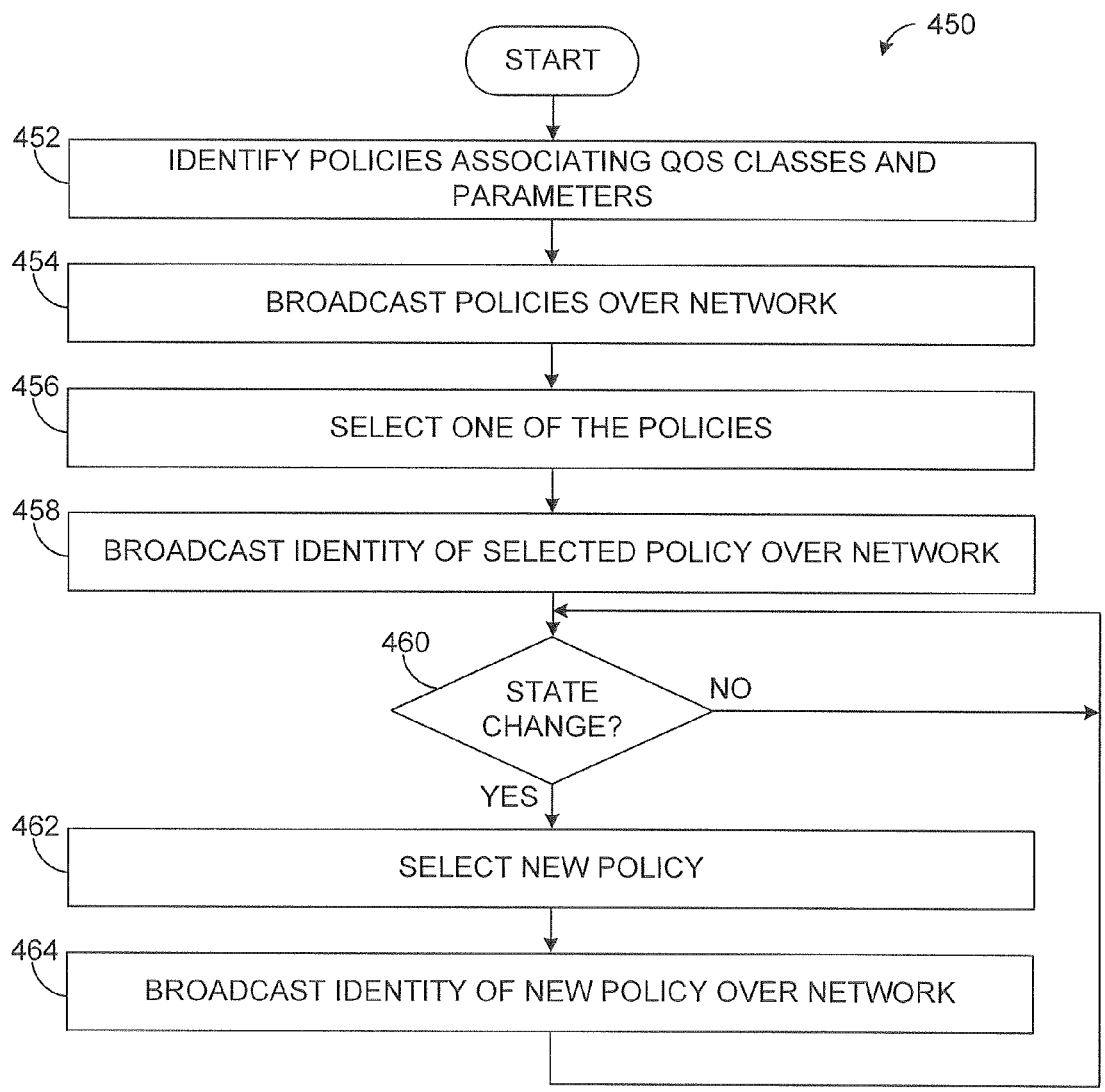

FIGS. 4A and 4B illustrate example methods for dynamic assignment of quality of service parameters by a network manager 204 according to this disclosure. The embodiments of the methods shown in FIGS. 4A and 4B are for illustration only. Other embodiments of the methods could be used without departing from the scope of this disclosure.

As shown in FIG. 4A, a method 400 includes identifying quality of service classes for various types of data messages in a communication network at step 402. This could include, for example, the controller 302 in the network manager 204 examining QoS data provided by a user or provided by another source. The controller 302 could identify the various types of data messages that can be routed over a wireless or wired network and the QoS class for each of the data message types.

At least one parameter, such as priority, is identified for each of the QoS classes at step 404. This may include, for example, the controller 302 in the network manager 204 identifying a priority to be used when transporting the different types of data messages through a network. Other or additional parameters (such as encryption mechanisms, authentication mechanisms, message routing, number of retries, and the use of end-to-end acknowledgements) could also be identified at this step.

The identified parameters are broadcast to other components over the network at step 406. This could include, for example, the controller 302 in the network manager 204 broadcasting messages over its wired interface and/or its wireless interface. The broadcast data could, for instance, identify the quality of service priorities or other parameters to be used when transporting data over a wired or wireless network. At this point, the wired or wireless network may operate according to the broadcast quality of service parameters.

If a change in the network being managed or a larger system is detected at step 408, the priorities or other parameters of the QoS classes are dynamically reassigned at step 410. The state change can be detected in any suitable manner, such as based on user input or input from one or more external devices or systems. The dynamic reassignment may also occur in any suitable manner and may depend, at least in part, on the state change detected. For instance, in an emergency situation, the controller 302 could give higher priority to first responder voice and data traffic. If the emergency situation is a chemical leak or spill or other hazardous material discharge, the controller 302 could also give higher priority to real-time sensor data, which could be used to identify where the discharge occurred. As another example, after an explosion, the controller 302 could dynamically increase the number of routes that data from a particular source may traverse through a communication network to a destination, which may help to increase the likelihood that at least one route traversed by data was not interrupted or severed by the explosion. As yet another example, the state change could involve the resolution of an emergency or other condition, at which point the selected QoS parameters could represent the normal operating parameters of the network. Additional changes could involve easing or eliminating encryption and authentication mechanisms, increasing or decreasing the number of retries, and eliminating the use of end-to-end acknowledgements. Any other or additional changes can be made to the QoS classes.

The new parameters are then broadcast at step 412. In this way, the network manager 204 can select, enforce, and modify the QoS parameters used in a wired or wireless network dynamically. This allows the QoS parameters to be altered or adjusted in response to changing conditions in the system 100.

As shown in FIG. 4B, a method 450 includes identifying multiple quality of service policies at step 452. This could include, for example, the controller 302 in the network manager 204 examining QoS policy data provided by a user or by another source. The quality of service policies may associate quality of service classes for various types of data messages to various QoS parameters. For instance, each policy could identify the various QoS classes and each class' priority, encryption mechanism, authentication mechanism, message routing, and number of retries, as well as whether end-to-end acknowledgements are used.

The policies are broadcast over a network at step 454. This could include, for example, broadcasting all of the policies or a subset of the policies to various nodes and other devices in a wired or wireless network.

One of the policies is selected at step 456, and the identity of the selected policy is broadcast at step 458. The policy could be selected in any suitable manner. For example, the controller 302 in the network manager 204 could rely on user input or data from a wide variety of sources to determine the current state of a network or a larger system, and a policy could be selected based on that determination.

If a change in the network being managed or a larger system is detected at step 460, a new policy is selected at step 462 and broadcast at step 464. The state change can be detected in any suitable manner, such as based on user input or input from one or more external devices or systems. Also, the dynamic re-selection of a policy may occur in any suitable manner and may depend, at least in part, on the identified state change. Once again, in this way, the network manager 204 can select, enforce, and modify the QoS parameters used in a wired or wireless network dynamically. This allows the QoS parameters to be altered or adjusted in response to changing conditions in the system 100.

Although FIGS. 4A and 4B illustrate examples of methods for dynamic assignment of quality of service parameters by a network manager 204, various changes may be made to FIGS. 4A and 4B. For example, while each figure illustrates a series of steps, various steps in these figures could overlap, occur in parallel, occur multiple times, or occur in a different order. Also, other techniques could be used to select and distribute quality of service priorities or other parameters.

Figure 5:
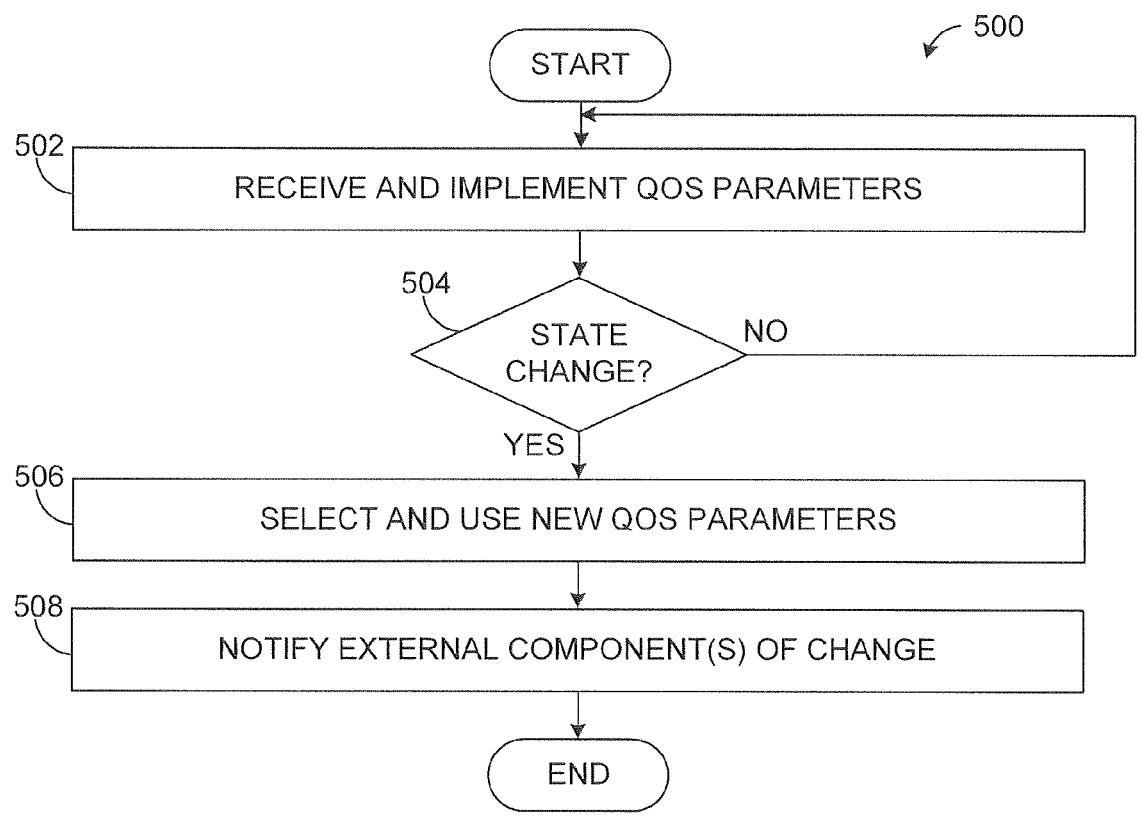
FIG. 5 illustrates an example method for dynamic assignment of quality of service parameters by a leaf node according to this disclosure.

FIG. 5 illustrates an example method 500 for dynamic assignment of quality of service parameters by a leaf node according to this disclosure. The embodiment of the method 500 shown in FIG. 5 is for illustration only. Other embodiments of the method 500 could be used without departing from the scope of this disclosure.

As shown in FIG. 5, the leaf node receives and implements one or more quality of service parameters at step 502. This may include, for example, the leaf node receiving information in the form of an individual QoS parameter, a group of QoS parameters, a policy associated with multiple QoS classes, or any other or additional information. As a particular example, the leaf node could receive multiple QoS policies at one time and then later receive an identification of one of the QoS policies. The information can be provided to the leaf node, for instance, by the network manager 204. At this point, the leaf node can use the QoS parameters, such as by assigning a QoS class to each data message transmitted by the leaf node and handling the data messages accordingly.

If a state change is detected by the leaf node at step 504, the leaf node can select one or more new quality of service parameters at step 506. This may include, for example, the leaf node identifying one or more problems in the industrial control and automation system 100. As a particular example, the leaf node could represent a sensor that can detect hazardous materials, and the leaf node could select a new QoS policy when a hazardous material is detected. Any other or additional mechanisms could be used to select one or more different QoS parameters at the leaf node. At this point, the leaf node can use the new QoS parameters during its communications. The leaf node could also inform one or more external components of the change in the QoS parameter(s) at step 508. This could include, for example, the leaf node informing one or more infrastructure nodes, gateway infrastructure nodes, other leaf nodes, or the network manager 204. This may allow other components to adjust their QoS parameters, as well. Part or all of the method 500 could then be repeated, such as when additional QoS parameters are received or additional state changes occur.

Although FIG. 5 illustrates one example of a method 500 for dynamic assignment of quality of service parameters by a leaf node, various changes may be made to FIG. 5. For example, while shown as a series of steps, various steps in FIG. 5 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, at a first leaf node, a plurality of quality of service parameters associated with at least one quality of service class, the quality of service parameters further associated with an industrial control and automation system comprising a plurality of wireless internally-powered leaf nodes and a plurality of line-powered infrastructure nodes, the quality of service parameters being transmitted by a gateway node to at least one of the infrastructure nodes and then wirelessly transmitted to the first leaf node, the gateway node configured to convert the quality of service parameters from an Ethernet format to an IEEE 802.11 wireless protocol format;
   identifying, at the first leaf node, an emergency condition associated with the industrial control and automation system;
   selecting, at the first leaf node and based on the identified emergency condition, one or more quality of service parameters of at least one data message to be routed through a communication network associated with the industrial control and automation system;
   based on the plurality of received quality of service parameters and the one or more selected quality of service parameters, assigning at the first leaf node a specified quality of service class to the at least one data message; and
   communicating, from the first leaf node, the at least one data message with the assigned quality of service class to at least one of: one or more other leaf nodes and one or more infrastructure nodes in the communication network;
   wherein:
      the leaf nodes and the infrastructure nodes in the communication network operate according to a first quality of service policy;
      selecting the one or more quality of service parameters comprises selecting a second quality of service policy;
      the second quality of service policy identifies a priority for each of multiple types of data messages based upon a type of identified emergency condition and a recipient of information; and
      an operation of the gateway node and the infrastructure nodes is configured by an OLE for Process Control (OPC) server, the OPC server configured to distribute cryptographic security keys to the gateway node and at least one of the infrastructure nodes.

2. The method of claim 1, further comprising:
   selecting the first quality of service policy; and
   communicating information identifying the first quality of service policy over the communication network.

3. The method of claim 1, wherein selecting the one or more quality of service parameters comprises identifying a higher quality of service priority for traffic to and from specified personnel.

4. The method of claim 3, wherein:
   the specified personnel comprise at least one of: police officers, firefighters, medical personnel, and hazardous material personnel; and
   the traffic comprises real-time sensor data.

5. The method of claim 1, wherein the one or more selected quality of service parameters comprise at least one of: an encryption mechanism, an authentication mechanism, a number of routes traversed through the communication network, a number of retries for sending data, and use of end-to-end acknowledgements.

6. The method of claim 1, further comprising:
   identifying a second condition associated with at least one of: the communication network and the industrial control and automation system;
   selecting, based on the identified second condition, one or more second quality of service parameters; and
   communicating information identifying the one or more second quality of service parameters to the one or more other leaf nodes and infrastructure nodes in the communication network.

7. The method of claim 1, further comprising:
   determining that the emergency condition has been resolved;
   selecting one or more second quality of service parameters associated with normal operation of the communication network; and
   communicating information identifying the one or more second quality of service parameters to the one or more other leaf nodes and infrastructure nodes in the communication network.

8. An apparatus comprising:
   a first wireless leaf node comprising:
      at least one interface that communicates with other nodes in a communication network associated with an industrial control and automation system, the industrial control and automation system comprising a plurality of wireless internally-powered leaf nodes and a plurality of line-powered infrastructure nodes; and at least one controller that:
receives a plurality of quality of service parameters associated with at least one quality of service class from a gateway node via at least one of the infrastructure nodes, the quality of service parameters further associated with the industrial control and automation system, the gateway node configured to convert the quality of service parameters from an Ethernet format to an IEEE 802.11 wireless protocol format;
identifies an emergency condition associated with the industrial control and automation system;
selects, based on the identified emergency condition, one or more quality of service parameters of at least one data message to be routed through the communication network;
based on the plurality of received quality of service parameters and the one or more selected quality of service parameters, assigns a specified quality of service class to the at least one data message; and
communicates the at least one data message with the assigned quality of service class to at least one of: one or more other leaf nodes and one or more infrastructure nodes in the communication network using the at least one interface;
wherein:
the leaf nodes and the infrastructure nodes in the communication network operate according to a first quality of service policy;
the at least one controller selects the one or more quality of service parameters by selecting a second quality of service policy;
the second quality of service policy identifies a priority for each of multiple types of data messages based upon a type of identified emergency condition and a recipient of information; and
an operation of the gateway node and the infrastructure nodes is configured by an OLE for Process Control (OPC) server, the OPC server configured to distribute cryptographic security keys to the gateway node and at least one of the infrastructure nodes.

9. The apparatus of claim 8, wherein the at least one controller selects the one or more quality of service parameters by selecting the second quality of service policy from multiple quality of service policies.

10. The apparatus of claim 9, wherein:
the at least one controller further communicates the multiple quality of service policies to the one or more other leaf nodes and infrastructure nodes in the communication network prior to the selection of the second quality of service policy; and
the at least one controller communicates information identifying the selected second quality of service policy to the one or more leaf nodes and infrastructure nodes in the communication network.

11. The apparatus of claim 8, wherein the at least one controller selects the one or more quality of service parameters by identifying a higher quality of service priority for traffic to and from specified personnel.

12. The apparatus of claim 11, wherein:
the specified personnel comprise at least one of: police officers, firefighters, medical personnel, and hazardous material personnel; and
the traffic comprises real-time sensor data.

13. The apparatus of claim 8, wherein the one or more selected quality of service parameters comprise at least one of: an encryption mechanism, an authentication mechanism, a number of routes traversed through the communication network, a number of retries for sending data, and use of end-to-end acknowledgements.

14. The apparatus of claim 8, wherein the at least one controller further:
identifies a second condition associated with at least one of: the communication network and the industrial control and automation system;
selects, based on the identified second condition, one or more second quality of service parameters; and
communicates information identifying the one or more second quality of service parameters to the one or more other leaf nodes and infrastructure nodes in the communication network.

15. The apparatus of claim 8, wherein the at least one controller further:
determines that the condition has been resolved;
selects one or more second quality of service parameters associated with normal operation of the communication network; and
communicates information identifying the one or more second quality of service parameters to the one or more other leaf nodes and infrastructure nodes in the communication network.

16. The apparatus of claim 8, wherein the at least one interface comprises one or more of:
a wired Ethernet network interface; and
a radio frequency transceiver.

17. A non-transitory computer readable storage medium embodying a computer program, the computer program comprising computer readable program code for:
receiving, at a first leaf node, a plurality of quality of service parameters associated with at least one quality of service class from a gateway node via at least one of a plurality of line-powered infrastructure nodes, the quality of service parameters further associated with an industrial control and automation system comprising a plurality of wireless internally-powered leaf nodes and the plurality of line-powered infrastructure nodes, the gateway node configured to convert the quality of service parameters from an Ethernet format to an IEEE 802.11 wireless protocol format;
identifying, at the first leaf node, an emergency condition associated with the industrial control and automation system;
selecting, at the first leaf node and based on the identified emergency condition, one or more quality of service parameters of at least one data message to be routed through a communication network associated with the industrial control and automation system;
based on the plurality of received quality of service parameters and the one or more selected quality of service parameters, assigning at the first leaf node a specified quality of service class to the at least one data message; and
communicating, from the first leaf node, the at least one data message with the assigned quality of service class to at least one of: one or more other leaf nodes and one or more infrastructure nodes in the communication network;
wherein:
the leaf nodes and the infrastructure nodes in the communication network operate according to a first quality of service policy;
the computer readable program code for selecting the one or more quality of service parameters comprises computer readable program code for selecting a second quality of service policy;

the second quality of service policy identifies a priority for each of multiple types of data messages based upon a type of identified emergency condition and a recipient of information; and an operation of the gateway node and the infrastructure nodes is configured by an OLE for Process Control (OPC) server, the OPC server configured to distribute cryptographic security keys to the gateway node and at least one of the infrastructure nodes.

18. The computer readable storage medium of claim 17, wherein the computer readable program code for selecting the one or more quality of service parameters comprises computer readable program code for selecting the second quality of service policy from multiple quality of service policies.

19. The computer readable storage medium of claim 16, wherein the one or more selected quality of service parameters comprise at least one of: an encryption mechanism, an authentication mechanism, a number of routes traversed through the communication network, a number of retries for sending data, and use of end-to-end acknowledgements.

20. The computer readable storage medium of claim 17, wherein the computer program further comprises computer readable program code for:

determining that the emergency condition has been resolved;

selecting one or more second quality of service parameters associated with normal operation of the communication network; and communicating information identifying the one or more second quality of service parameters to the one or more other leaf nodes and infrastructure nodes in the communication network.

* * * * *